United States Patent Office 3,376,278
Patented Apr. 2, 1968

3,376,278
PROCESS FOR THE CHEMICAL MODIFICATION OF THE SOLID SURFACE OF A POLYMER
Albert Wayne Morgan, North St. Paul, Minn., and Jack Spencer Swenson, Grinnell, Iowa, assignors to Minnesota Mining and Manufacturing Company, St. Paul, Minn., a corporation of Delaware
No Drawing. Filed Nov. 6, 1964, Ser. No. 409,615
9 Claims. (Cl. 260—93.7)

ABSTRACT OF THE DISCLOSURE

This invention relates to a method for chemically modifying the surface of polymers having aliphatic carbon-hydrogen bonds by contacting the surface with a divalent carbon species, preferably a divalent carbon species derived from the exposure of an organic diazo compound to radiation causing decomposition thereof.

---

This invention relates to a method for the surface modification of polymers and to the resulting modified surfaces. In one aspect this invention relates to a process for the chemical modification of a solid polymer surface. In still another aspect this invention relates to a process for chemically altering the surface properties of a solid polymeric surface.

The innumerable synthetic polymers which have been prepared, tested and reported in the literature reflect the increasing importance of achieving new materials with properties and uses otherwise not attainable. Such proliferation has had its disadvantages, not the least of which is the relatively high cost of research and manufacture. As a result, many synthetic polymers can be more appropriately classified as "specialty chemicals" than as new polymers with a wide range of useful applications. The alternative of modifying a known synthetic polymer to enhance or modify its properties frequently involves the sacrifice of other desirable properties and quite commonly necessitates expensive and complicated procedures and formulations. Such problems are aggravated when only surface modification of a solid synthetic polymer is attempted, as illustrated by the various techniques described for subbing or priming polymer surfaces to improve adhesion, promote wettability or solvent resistance, etc. Irradiated polyethylene can be bonded to itself through curing with heat and pressure in the presence of a free radical generating compound such as a peroxide, perester, azo compounds, etc., as disclosed in U.S. 2,936,261. Other methods relying on crosslinking or vulcanization, surface degradation, swelling, or on introducing reactive inorganic groups such as sulfonic, chloric or chlorosulfonic groups into the polymer surface have been reported, e.g. see U.S. Patent Nos. 2,764,502; 2,785,085; 2,943,937; 3,022,192; 3,051,597; and 3,112,199 and German Patent No. 1,131,987. However, since most of these surface treatment techniques are limited in their effectiveness to certain polymers or polymer classes, a simple and effective means for modifying a wide range of differing solid polymer surfaces and to control the degree and effect of such modification has been greatly needed.

Chemical modification of solid surfaces poses unique problems as compared to chemical reactions in solution or in dispersion. The solid surface is never entirely uniform, and the orientation of molecules at the solid surface is generally restricted, thus limiting their chemical reactivity. Additionally, solid surfaces are frequently contaminated with adsorbed materials, such as carbon dioxide, water, oxygen, etc., which are frequently very difficult to remove. Atmospheric contamination of a solid surface can present a serious impurity problem in interfacial chemical reactions and can affect the course of the reaction. The reaction kinetics of free radicals in a homogeneous system, e.g. solution, are greatly different from the reaction kinetics of free radicals in a heterogeneous system, e.g. a solid surface. Since a solid surface differs from a solution in physical, thermodynamic and free energy characteristics, the field of chemical reactions involving solid surfaces has been under recent investigation as a separate and distinct discipline.

It is an object of this invention to provide a process for the modification of various solid polymer surfaces.

Another object of this invention is to provide both a process for the chemical modification of the surface of a solid organic polymer without the necessity for using inorganic reagents and also modified polymeric products produced thereby.

Still another object of this invention is to chemically react organic reagents with the solid surface of a synthetic organic polymer.

A further object of this invention is to modify solid polymeric surfaces by the interfacial reaction of divalent carbon species and the polymeric structure.

Various other objects and advantages will become apparent from the following description and samples.

"Divalent carbon species," as used herein, means a divalent carbon atom which is linked to two adjacent atoms or groups by covalent bonds and possesses two non-bonding electrons having either antiparallelspin (singlet state) or parallel spin (triplet state), as defined in Carbene Chemistry, W. Kirmse, Academic Press, N.Y. (1964), page 1.

It has been found that the solid surfaces of polymers containing a plurality of non-aromatic carbon-hydrogen bonds can be modified by reaction with a divalent carbon species. This reaction of divalent carbon species with the non-aromatic carbon-hydrogen bonds in the polymer, explained by means of either an insertion or hydrogen abstraction mechanism, is accomplished by contacting the surface of the polymer with a diazo compound in which the diazo radical is attached to a non-aromatic carbon atom ($>CN_2$), i.e. a carbon atom which is not part of an aromatic ring system such as benzene, naphthalene, etc., and irradiating the interface between said diazo compound and the polymer surface with actinic radiation, e.g. electromagnetic radiation such as corona discharge, ultraviolet, infrared, visible light, gamma, beta, etc. These diazo compounds are normally non-gaseous and are characterized by their ability to generate divalent carbon species with the liberation of gaseous nitrogen when sufficient energy is supplied to the system in which they are contained, as indicated in Carbene Chemistry, W. Kirmse, Academy Press, N.Y. (1964). The presence of solid organic polymer and other organic heat degradable materials at the interfacial reaction site makes the use of radiant energy necessary to avoid deterioration and other undesired changes from occurring. Accordingly, energy provided by the conduction of heat, although capable of generating the divalent carbon species from the diazo compounds, is not generally as effective as radiation for this purpose. The amount of actinic irradiation supplied to the polymer surface can vary widely, depending on the particular diazo compound selected and the nature of the solid polymer surface. Since the energy supplied in radiant form must be sufficient to cause decomposition of the diazo compound with the liberation of gaseous nitrogen and the bond energy of a carbon-nitrogen bond is about 66 kilocalories per mole, a theoretical minimum energy level at the reactive interface can be estimated. However, it is more practical to use a radiation source and exposure which is sufficient to produce a concentration level of the divalent carbon species that will detectably alter the surface properties of the solid polymer but which is not of such extreme magnitude to alter adversely the other materials exposed to the radiation. The optimum radiation requirements for generating the desired free radicals can readily be determined. Since the divalent carbon species formed from the decomposition of the diazo compounds react with olefins containing carbon-hydrogen bonds upon irradiation with ultraviolet light, they may be irradiated for varying times and at varying radiation levels in solvent media containing olefins such as tetramethylethylene or cyclohexene, and the reaction mixture can then be analyzed for insertion products, cyclopropane ring formation, coupling products or azines, which indicate formation of the divalent carbon species. A suitable immersion well test may be conducted as follows.

A one liter resin flask equipped with a thermometer well and a clear fused quartz immersion well containing a Hanovia Laboratory Photochemical lamp (100 or 450 watt) or other radiation source is filled with the olefin and the temperature is adjusted with vigorous stirring to from about −70° C. to about +100° C. (preferably 0° C. or lower using Dry Ice in acetone). Cooling water is used to cool the lamp. With the lamp turned on, a concentrated solution of the normally liquid or solid diazo compound in the olefin or an inert solvent miscible with the olefin is slowly added dropwise with stirring to the olefin in the flask, e.g. over a period of about three hours. With the lamp on the reaction mixture is stirred until the characteristic color associated with the strongly colored diazo compound changes or disappears. The reaction mixture is then filtered to remove any precipitate, and the remaining unreacted olefin is removed from the filtrate by crystallization or distillation techniques. All precipitates and residues are then analyzed by one or more well known characterizing tests, including infrared spectra, melting point, elemental analysis, test for unsaturation, and nuclear magnetic resonance. The presence of insertion products, cyclopropane rings, coupling products or azines indicates the decomposition of the diazo compound with the formation of the corresponding divalent carbon species. The following example will illustrate the technique.

Example 1

Using the equipment described above, approximately one liter of tetramethylethylene was placed in a resin flask. The ultraviolet light source (100 watt) was activated, and the resin flask was placed in a Dry Ice-acetone bath until temperature equilibrium was reached (about −50° C.). A solution of 19 grams of diphenyldiazomethane in 200 milliliters of tetramethylethylene was added dropwise with stirring to the contents of the resin flask over a period of three hours, after which the reaction mixture was stirred with the ultraviolet light source turned on for an added period of eight hours. At the end of the reaction period the color had changed from a deep purple to an iridescent yellow. After the first four hours of ultraviolet irradiation the white precipitate which formed was filtered and identified as product I (melting point 190°–220° C.). At the end of the irradiation the yellow precipitate which formed was filtered and identified as product II (melting point 185°–189° C.). The final filtrate was then placed in a two liter flask and was distilled at 71° C., leaving a yellow-red oil as residue. This oil residue was placed in a semi-micro distillation apparatus consisting of a 60 milliliter flask, 12 cm. Vigreaux column, condenser and fraction collector. The oil distilled at 3 mm. mercury pressure, producing two fractions, product II (50° C./3 mm.) and product IV (140° C.–160° C./3 mm.). Infrared spectra of each of the four products was obtained. Product I was identified as tetraphenylethylene on the basis of the infrared spectrum and melting point. Product II was identified by infrared spectrum and positive test for nitrogen as $(C_6H_5)_2C=N-N=C(C_6H_5)_2$. Product III was identified as octamethylcyclobutane from the infrared spectrum, and product IV was a mixture of isomeric addition products with the structure $(CH_3)_2C=C(CH_3)CH_2CH(C_6H_5)_2$ as shown by the infrared spectrum and a positive bromine test for a double bond.

Polymers which contain non-aromatic (i.e. aliphatic, heterocyclic and alicyclic) carbon-hydrogen bonds are well known. For the purpose of this invention, the most useful polymers are those in which the carbon atoms of the carbon-hydrogen bonds do not constitute a part of an aromatic ring system and in which at least 50 percent of the non-aromatic carbon atoms of the polymer contain at least one such carbon-hydrogen bond. Saturated or unsaturated aliphatic homopolymers or interpolymers, including the cycloaliphatic and mixed aromatic-aliphatic polymers (particularly those of the synthetic type) are the most preferred, as exemplified by polyvinyl chloride, casein polyvinylidene chloride, polypropylene, polyethylene, polymethyl siloxane, polystyrene, vinyl chloride-vinylidene fluoride copolymer, natural rubber, styrene-acrylic acid copolymer, gelatin, cellulose acetate, polyacetal, polyethylene terephthalate, cellophane, ethylene-propylene copolymers, polyvinyl fluoride, polyvinyl alcohol, polyvinyl ethers, acrylate and methacrylate polymers, polybutadiene, etc. In addition to the reaction of the divalent carbon species with the carbon-hydrogen bonds, the presence of unsaturated linkages in the polymer also provides sites which can be attacked by the divalent carbon species.

Suitable normally solid or normally liquid diazo compounds include aliphatic, aromatic and alicyclic diazo compounds (see Azo and Diazo Chemistry, Aliphatic and Aromatic Compounds, H. Zollinger, Interscience Publishers, N.Y. (1961)), preferably a diaryl diazomethane (e.g. 1,4-bis-phenyldiazomethyl-benzene; 1,4-bis-(biphenyldiazomethyl) benzene; 4,4'-dianisyldiazomethane; 4,4'-bis-dimethylaminophenyl diazomethane; biphenyldiazomethane; phenyl-diphenyldiazomethane), an aryl alkyl diazomethane (e.g. p-nitrophenyl-methyl diazomethane; (5'-diazo-5'-phenyl-n-pentyl) diazomethane), a diazoketone (e.g. 1,8-bisdiazo-2,7-diketooctane), a monoalkyl diazomethane (e.g. 5'-diazo-n-pentyl diazomethane), a monoaryl diazomethane (e.g. p-nitrophenyl diazomethane; m-nitrophenyl diazomethane; 4-diazomethyl phenyl diazomethane); a dialkyl diazomethane (e.g. methyl-t-butyl diazomethane; methyl ethyl diazomethane) and a diazoester (e.g. ethyl diazoacetate).

The polymer surface modification of this invention is achieved by contacting the surface of the solid polymer with the diazo compound and irradiating the surface with radiant energy of a type and of an intensity sufficient to cause the decomposition of the diazo compound into free nitrogen and the corresponding divalent carbon species. The type and intensity of the radiation can readily be determined by the immersion well test described earlier. Useful information on radiation decomposition of diazo compounds is reported in the literature, e.g. see Azo and Diazo Chemistry, H. Zollinger, Interscience Publishers, Inc. N.Y. (1961); Divalent Carbon, J. Hine, Ronald Press Co., N.Y. (1964). Particularly when the surface modification is intended to serve a priming function for an adhesive material or another coating material, e.g. a photographic emulsion or an otherwise non-compatible plastic, suitable alternative procedures include solution coating the diazo compound onto the polymer surface and irradiating before a further coating is applied, applying a mixture of the diazo compound and an adhesive or a film forming material onto the polymer surface and irradiating, or coating the diazo compound onto the polymer surface and then applying adhesive or a film forming material before irradiating the interface. The irradiation can either be supplied directly to the exposed polymer surface or indirectly through the polymer backing or any top-coating, the radiation level being adjusted accordingly to provide the desired intensity at the reactive interface without deleterious effect on the polymer or the other coating materials through which the radiation must penetrate.

Example 2

One milliliter of a 20 weight percent solution of ethyl diazoacetate in toluene was knife-coated (½ mil orifice) on a 4 x 8 square inch panel of oriented polypropylene film. The matte side of the film was corona treated before the coating was laid down. After the coated sample had air dried, it was irradiated at a distance of one-half inch for one hour with a Hanovia SH lamp (Quartz, U.V., 100 watt). After washing with toluene, the irradiated film had improved wetting properties with regard to water and methyl ethyl ketone as compared to a similarly irradiated uncoated control sample.

Example 3

One milliliter of a 20 weight percent solution of ethyl diazoacetate in benzene was knife-coated (½ mil orifice) on a 4 x 8 square inch panel of polypropylene. The shiny, non-corona treated side of the polypropylene was used as the experimental side for this coating. The coated panel was irradiated at a distance of one-half inch for one hour with a 15 watt germicidal lamp. After washing with benzene the irradiated panel had improved wetting characteristics.

Example 4

A coated panel was prepared in the same manner as in Example 3. The coating was irradiated with an electrostatic discharge (Tesla) coil. After a benzene wash treatment the irradiated panel had improved wetting characteristics with water, methyl ethyl ketone and methyl isobutyl ketone. An uncoated control sample showed no noticeable improvement in wetting characteristics.

Example 5

A coated panel prepared in a manner similar to that of Example 3 was irradiated at a distance of one-half inch for 20 minutes with a Hanovia SH lamp (Quartz, ultraviolet, 100 watt). Improved wetting characteristics were found after the panel was washed with benzene. An uncoated control showed no change.

Example 6

Four samples were prepared using a solution of ethyl diazoacetate knife-coated from a 20 weight percent toluene solution onto calendered polypropylene using a ½ mil orifice. The following table summarizes the activating techniques and the adhesion of styrene-ethyl acrylate copolymer to the modified surface. Adhesion was determined by strip-back test involving applying a strip of adhesive tape to the coated surface and removing the tape at various angles and speeds.

TABLE I

| Sample | Treatment | Adherence of Styrene-ethyl acrylate copolymer |
|---|---|---|
| 1 (coated) | Electrostatic discharge | Greatly improved. |
| 2 (control) | do | Slight improvement. |
| 3 (coated) | 25 minute, 100 watt ultraviolet | Greatly improved. |
| 4 (control) | do | No improvement. |

Example 7

The shiny side of polypropylene film was knife-coated (1 mil orifice) with a 20 weight percent solution of ethyl diazoacetate in benzene. The coated sample and an uncoated control sample were both similarly irradiated at a distance of one-half inch for one hour with a 15 watt germicidal lamp. The benzene washed coated sample was more easily wetted with water than the uncoated sample. Infrared analysis of the washed samples indicated the presence of an ester carbonyl group, apparently resulting from an insertion reaction, in the irradiated, coated sample. A sample which was similarly coated but not irradiated was washed and had an infrared analysis identical to the uncoated sample.

Example 8

Matte finish polypropylene film was coated onto the matte side with benzene solutions of 4,4'-bis(dimethylaminophenyl) diazomethane, p-nitrophenyl diazomethane and m-nitrophenyl diazomethane. Samples of these coated films were irradiated from the back side of the polypropylene film with a fluorescent sun lamp at 180° F. for 1, 3 and 5 minutes and one sample was irradiated from the coated side for 3 minutes. Uncoated control samples were similarly irradiated. Thorough solvent cleaning techniques were utilized to remove residual diazo compounds and reaction products to prepare the surface for infrared analysis which showed the presence of the nitro group and the substituted aromatic groups in the coated sample. Increased adhesion of an adhesive (alkyl acrylate-acrylic acid copolymer) was observed for the surface treated with 4,4'-bis(dimethyl aminophenyl)-diazomethane as compared to its control. All coated samples had significantly different wetting characteristics.

Example 9

A mixture of 10 parts by weight of a natural rubber-polyterpene (i.e. poly-beta-pinene, ball and ring softening point of 115° C.) resin adhesive (4.3 weight ratio) and one part of diphenyldiazomethane (15.5 weight percent solids solution in hexane) was knife-coated (2 mil orifice) onto the shiny, corona treated side of polypropylene film. This coated sample was irradiated through the polypropylene film for 10 minutes with a 15 watt germicidal lamp at a distance of one-half inch. Anchorage in the strip-back test, described earlier, was excellent. The control sample did not anchor.

Example 10

The coating solution of the preceding example was coated (6 mil orifice) onto cellulose acetate film. The coated film was subjected to irradiation through the film for 5 minutes, using a 15 watt germicidal lamp at a distance of one-half inch. Anchorage in the strip-back test was excellent. A control sample without diphenyl diazomethane did not anchor.

Example 11

A 10:1 weight ratio mixture of an alkyl acrylate-acrylic acid copolymer of the type described in U.S. Patent Re. 24,906 and diphenyldiazomethane was coated onto polypropylene film and irradiated as in Example 9. Excellent anchorage as determined by the strip-back test was obtained. A control sample coated with the same copolymer without the use of diphenyldiazomethane and similarly treated did not provide acceptable anchorage.

Example 12

A mixture of 20 parts by weight of polymethyl siloxane, 0.2 part of a polymethyl siloxane curing agent, 79 parts toluene and 1 part diphenyldiazomethane was coated onto the matte finish and onto the shiny corona treated side of polypropylene film to improve release characteristics. After irradiation at a distance of one-half inch from a 15 watt germicidal lamp for 10 minutes through the film into the coating, tests showed that the anchorage produced was excellent. In contrast, a similarly treated control without the inclusion of diphenyldiazomethane resulted in essentially no anchorage.

Example 13

A 10:1 weight ratio admixture of polymethyl siloxane adhesive and diphenyldiazomethane was coated onto the matte side of polypropylene film and irradiated at a distance of one half inch for 10 minutes with six 15 watt germicidal lamps. The reverse shiny side of the polypropylene film was then coated with a 10:1 weight ratio mixture of polyalkyl acrylate pressure sensitive adhesive and diphenyldiazomethane and irradiated at a distance of one-half inch for 10 minutes with six 15 watt germicidal lamps. Both adhesive coatings were securely bonded to the propylene substrate.

Example 14

After a three minute exposure to a 15 watt germicidal lamp a mixture of ten parts of polymethyl siloxane adhesive to one part of diphenyldiazomethane was securely bonded to unplasticized polyvinylchloride film.

Example 15

An 18 weight percent heptane solution containing 9 parts of polychloroprene (Saran F 220), 9 parts of the crude rubber-resin mixture of Example 9 (natural rubber, polyterpene resin) and 1 part of diphenyldiazomethane was coated (3 mil knife-coating) onto unplasticized polyvinylchloride film. After irradiation through the film for five minutes with a 15 watt germicidal lamp at a distance of one-half inch, followed by heating the construction at 120° F. for 10 minutes, excellent anchorage to the polyvinylchloride film was obtained. A control sample omitting the diphenyldiazomethane showed essentially no anchorage.

Example 16

Following the same techniques described in the preceding example and applying the coating to a polyvinyl fluoride film, excellent anchorage was achieved.

Example 17

Using a coating solution containing 10 parts of polyalkyl acrylate and one part of diphenyldiazomethane, polyvinyl fluoride film was coated and irradiated as in the preceding example. The resulting anchorage was excellent.

Example 18

A 10:1 weight ratio admixture of the crude rubber-resin blend of Example 9 (natural rubber, polyterpene resin) and 1,6-diphenyl-1,6-bis-diazohexane was coated onto polypropylene film, heated to 200° F. and irradiated for 1 minute with a 15 watt germicidal lamp at a distance of one-half inch. Excellent anchorage was obtained. Anchorage was also obtained when alkyl acrylate-acrylic acid copolymer was used in place of the crude rubber-resin blend.

Example 19

A 1:1 weight mixture of the solutions of 5 percent atactic propylene in toluene and 10 percent 1,6-diphenyl-1,6-bis-diazohexane in benzene was knife-coated (½ mil) onto shiny non-corona treated polypropylene and was overcoated with a 6 mil dry coating of the crude rubber-resin blend of Example 9 and thereafter was irradiated through the backing for 10 minutes with a 15 watt germicidal lamp at a distance of one-half inch. Anchorage of the crude rubber-resin blend to the substrate through the tie coat was very good. A control sample omitting the diazo compound showed poor adhesion.

Example 20

An 8 weight percent solution of $N_2C(SO_3K)_2$ in water was prepared and mixed (1:10 volume ratio) with the crude rubber-resin blend of Example 9. This mixture was then coated (2 mil) onto the shiny side of oriented, non-corona treated polypropylene film. After irradiation through the film backing for 5 minutes with a 15 watt germicidal lamp at a distance of one-half inch, excellent anchorage was obtained.

Example 21

A 10:1 weight ratio admixture of vinylidene chloride-acrylonitrile copolymer and diphenyldiazomethane (15 weight percent in a 2/1 volume mixture of tetrahydrofuran and toluene) was squeeze-roll coated onto the shiny side of a 1.75/1 oriented non-corona treated polypropylene film. The sample was irradiated at a distance of one-half inch and at a temperature of 200° F. with two 15 watt germicidal lamps. Separate samples were irradiated for one minute and three minutes respectively. Control samples omitting the diphenyldiazomethane were prepared and treated in a similar fashion. In each instance the sample containing the diphenyldiazomethane had significantly increased adhesion to the polypropylene film as compared to the control samples.

Example 22

A coating composition containing ten parts by weight of an alkyl acrylate-acrylic acid copolymer of the type described in U.S. Patent Re. 24,906 and 0.5 part by weight of p-biphenyl phenyldiazomethane was coated onto a polyethylene terephthalate polyester film and dried for 10 minutes at 120° F. The resulting sample, along with a control sample similarly prepared with the omission of the diazo compound, was irradiated at a distance of one-half inch with a 15 watt germicidal lamp for a period of 5 seconds. The sample containing the diazo compound showed good anchorage whereas the control sample had essentially no anchorage.

Example 23

A 20 weight percent benzene solution of ethyl diazoacetate was coated onto one surface of a polypropylene film. After this coating had dried, a 15 weight percent toluene solution of a polyamyl acrylate pressure sensitive adhesive was knife-coated (3 mil thickness) onto the same surface. The coated panel was exposed to 5 megarads of irradiation from a cobalt 60 source (gamma radiation). Good anchorage to the polypropylene film was obtained. Control samples similarly treated with the omission of the diazo compound showed no significant improvement in adhesion.

Example 24

A coating solution (20 weight percent solids in toluene) was prepared from 50 parts by weight of natural pale crepe rubber, 25 parts by weight of the polyterpene resin of Example 9 (Piccolyte S-115), 3 parts by weight of substituted phenol-formaldehyde resin (Bakelite CKR-1634) and 78 parts of polychloroprene (Neoprene W). To this coating solution was added 1 part by weight of diphenyldiazomethane for each 100 parts by weight of the total solids. The resulting solution was coated (6 mil thickness) onto 1 side of a polypropylene film. After the coating had dried a second solution was coated over the first, the second solution containing about 20 percent solids in toluene of natural pale crepe rubber (50 parts), polyterpene (25 parts) and resorcinol-formaldehyde resin (3 parts) to provide a 6 mil pressure sensitive adhesive overcoat on the first or primer coat. The other side of the polypropylene film was then coated with a solvent solution containing 99 parts by weight of vinylidene chloride-acrylonitrile copolymer (Saran F220) and 1 part by weight of diphenyldiazomethane to provide a release layer. The final construction was irradiated through the backing (i.e. through the side containing the vinylidene chloride-acrylonitrile copolymer coating) for 5 minutes at 200° F. using two 15 watt germicidal lamps at a distance of one-half inch. Excellent adhesion was obtained for both the vinylidene chloride-acrylonitrile copolymer release agent and the pressure sensitive adhesive coating on the other side of the polypropylene film. This film construction performed well as a masking tape.

From the foregoing description it will be apparent that the process of this invention provides a means for chemical modification of solid polymer surfaces and for altering the surface properties of such solid surfaces. This process can be used in the preparation of surfaces which have better bonding or adhesive properties, release properties, wetting characteristics, varying degrees of chemical reactivity, etc. For example, the practice of this invention can be used to improve the dye receptivity of various textile fibers and for improving the solvent resistance, solvent receptivity, chemical reactivity, or abrasion resistance of polymer surfaces. If the solid polymer film surface is irradiated in an imagewise fashion, it is possible to prepare a useful lithographic master in which the irradiated areas have different ink receiving and water wetting characteristics from the background or non-irradiated areas of the sheet. The alteration in an imagewise fashion of the physical and/or chemical properties of a solid polymer surface can be used for a variety of image forming processes which take advantage of the different physical and/or chemical properties of the irradiated surface portion, as will be apparent to those in the image reproduction field. Tape and film products, e.g. pressure sensitive masking tape, magnetic recording tape, etc., can also be prepared by the techniques of this invention. Various other embodiments and uses of the present invention will be apparent to those skilled in the art without departing from the scope of this invention.

The embodiments of the invention in which an exclusive property or privilege is claimed are defined as follows:

1. A process for the chemical modification of a solid surface of a polymer having aliphatice carbon-hydrogen bonds, at least 50% of the aliphatic carbon atoms thereof having at least one hydrogen substituent, which comprises contacting said surface with a diazo compound in which the diazo radical is attached to a non-aromatic carbon atom and exposing said surface to actinic radiation of sufficient intensity and duration to decompose said diazo compound with the generation of gaseous nitrogen and a divalent carbon species.

2. A process which comprises contacting the surface of a polymer having aliphatic carbon-hydrogen bonds, at least 50% of the aliphatic carbon atoms thereof having at least one hydrogen substituent, with an organic diazo compound in which the diazo radical is attached to a non-aromatic carbon atom, exposing said surface to actinic radiation of sufficient intensity and duration to decompose said diazo compound with the generation of gaseous nitrogen and a divalent carbon species, and applying a film forming polymer onto said surface.

3. A process which comprises contacting the surface of a polymer having aliphatic carbon-hydrogen bonds, at least 50% of the aliphatic carbon atoms thereof having at least one hydrogen substituent, with a homogeneous composition comprising a film forming polymer and an organic diazo compound in which the diazo radical is attached to a non-aromatic carbon atom, and exposing said surface to radiation of sufficient intensity and duration to decompose said diazo compound with the generation of gaseous nitrogen and a divalent carbon species.

4. A process which comprises contacting the surface of a polymer having aliphatic carbon-hydrogen bonds, at least 50% of the aliphatic carbon atoms thereof having at least one hydrogen substituent, with an organic diazo compound in which the diazo radical is attached to a non-aromatic carbon atom, applying a film forming polymer onto said surface, and exposing said surface to actinic radiation of sufficient intensity and duration to decompose said diazo compound with the generation of gaseous nitrogen and a divalent carbon species.

5. The process of claim 1 in which said diazo compound is 1,6-diphenyl-1,6-bisdiazohexane.

6. The process of claim 1 in which said diazo compound is diphenyldiazomethane.

7. The process of claim 1 in which said diazo compound is ethyl diazo acetate.

8. The process of claim 1 in which said diazo compound is 4,4'-bis-(dimethylaminophenyl) diazomethane.

9. A process for the chemical modification of a solid surface of a polymer having aliphatic carbon-hydrogen bonds, at least 50% of the aliphatic carbon atoms thereof having at least one hydrogen substituent, which comprises contacting said surface with divalent carbon species.

References Cited
UNITED STATES PATENTS

| | | | |
|---|---|---|---|
| 3,152,107 | 10/1964 | Muller et al. | 260—94.9 |
| 2,830,978 | 4/1958 | Muller et al. | 260—94.9 |
| 3,188,229 | 6/1965 | Graham | 117—93.31 |

JOSEPH L. SCHOFER, *Primary Examiner.*

L. EDELMAN, *Assistant Examiner.*

UNITED STATES PATENT OFFICE

CERTIFICATE OF CORRECTION

Patent No. 3,376,278                                              April 2, 1968

Albert Wayne Morgan et al.

It is certified that error appears in the above identified patent and that said Letters Patent are hereby corrected as shown below:

Column 2, line 24 "samples" should read -- examples --; line 52, "Academy" should read -- Academic --. Column 3, line 66, "product II" should read -- product III --. Column 6, line 25, "15.5" should read -- 15.25 --. Column 7, lines 2 and 47, "propylene", each occurrence, should read -- polypropylene --.

Signed and sealed this 29th day of July 1969.

(SEAL)
Attest:

Edward M. Fletcher, Jr.                              WILLIAM E. SCHUYLER, JR.
Attesting Officer                                              Commissioner of Patents